US009295082B2

(12) United States Patent
Sennett et al.

(10) Patent No.: US 9,295,082 B2
(45) Date of Patent: Mar. 22, 2016

(54) DISTRIBUTED MACHINE-TO-MACHINE CONNECTIVITY

(75) Inventors: Dewayne Sennett, Redmond, WA (US); Brian Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 155 days.

(21) Appl. No.: 13/095,686

(22) Filed: Apr. 27, 2011

(65) Prior Publication Data

US 2012/0278490 A1 Nov. 1, 2012

(51) Int. Cl.
*G06F 15/16* (2006.01)
*H04W 74/08* (2009.01)
*H04W 4/00* (2009.01)
*H04W 28/02* (2009.01)

(52) U.S. Cl.
CPC .......... *H04W 74/0833* (2013.01); *H04W 4/005* (2013.01); *H04W 28/0205* (2013.01)

(58) Field of Classification Search
CPC ............ H04W 28/0205; H04W 4/005; H04W 74/0833
USPC .......................................... 709/227; 370/252
See application file for complete search history.

(56) References Cited

U.S. PATENT DOCUMENTS

| 5,706,281 | A  | * | 1/1998  | Hashimoto et al. | 370/252 |
|-----------|----|---|---------|------------------|---------|
| 6,470,391 | B2 | * | 10/2002 | Takamoto et al.  | 709/227 |
| 7,783,776 | B2 | * | 8/2010  | Nimour           | 709/235 |
| 7,945,688 | B1 | * | 5/2011  | Lango et al.     | 709/231 |
| 2003/0195964 | A1 | * | 10/2003 | Mane          | 709/227 |
| 2005/0135348 | A1 | * | 6/2005  | Staack         | 370/353 |
| 2006/0101151 | A1 | * | 5/2006  | Mori et al.    | 709/230 |
| 2007/0183458 | A1 | * | 8/2007  | Bouazizi et al.| 370/498 |
| 2008/0153521 | A1 | * | 6/2008  | Benaouda et al.| 455/466 |
| 2009/0010642 | A1 | * | 1/2009  | Sui et al.     | 398/9   |
| 2009/0210724 | A1 | * | 8/2009  | Hori           | 713/193 |
| 2009/0296596 | A1 | * | 12/2009 | Take et al.    | 370/252 |
| 2009/0323659 | A1 | * | 12/2009 | Zhang          | 370/338 |

\* cited by examiner

*Primary Examiner* — Brian J Gillis
*Assistant Examiner* — Juan C Turriate Gastulo
(74) *Attorney, Agent, or Firm* — Baker & Hostetler LLP

(57) ABSTRACT

Connections and/or transmission times to or from machine-to-machine (M2M) type devices are staggered and/or randomized. M2M data/call sessions are distributed during a time interval. The distributed connections during a time frame can be random, pseudorandom, and/or distributed in accordance with a scheme to mitigate network congestion.

20 Claims, 8 Drawing Sheets

DISTRIBUTED MACHINE-TO-MACHINE CONNECTIVITY

TECHNICAL FIELD

The technical field generally relates to telecommunications, and more specifically relates to machine-to-machine wireless connectivity.

BACKGROUND

Machine-to-machine (M2M) devices are becoming more prevalent. M2M refers to a technology that allows devices and/or systems to communicate with other devices and/or systems of similar capabilities. Examples M2M type devices include eReaders like the KINDLE or the NOOK, temperature sensors, water meters, electric meters, gas meters on homes, condominiums, apartments, and in-vehicle automotive systems (e.g., navigation aids, emergency notification), or the like. Typically, an M2M device acquires information (e.g., temperature, utility usage, documents, etc.) and provides the information to another M2M device via a network. Due to the increasing number of M2M devices entering the marketplace, it is conceivable that network congestion may occur.

SUMMARY

Connections to machine-to-machine (M2M) type devices are staggered and/or randomized. Transmissions to and from M2M type devices also may be staggered and/or randomized. M2M call and/or data sessions are distributed during a time interval. The distributed connections during a time frame can be random, pseudorandom, and/or distributed in accordance with a scheme to mitigate network congestion.

DETAILED DESCRIPTION OF ILLUSTRATIVE EMBODIMENTS

Figure 1:
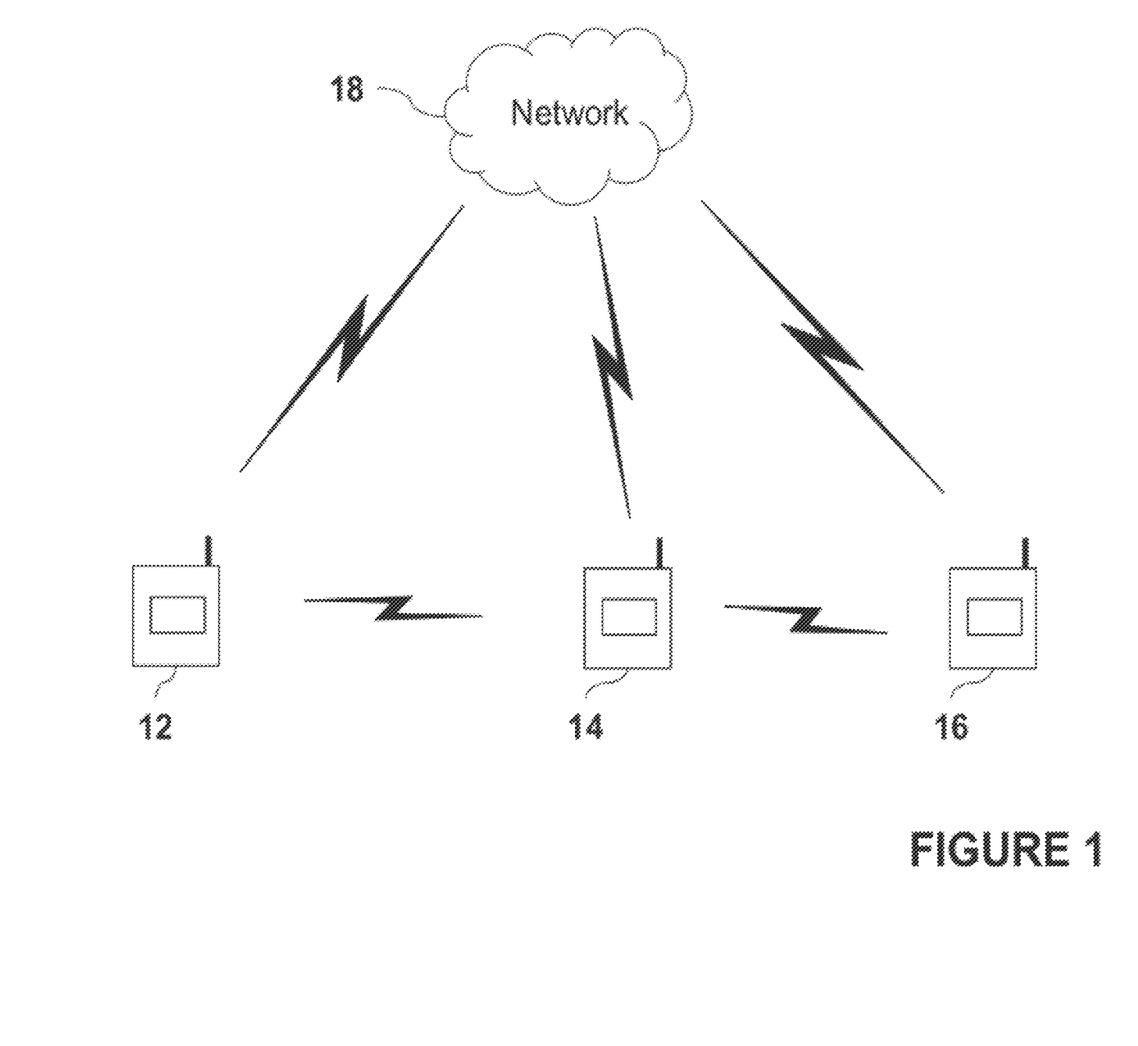
FIG. 1 is an example depiction of machine-to-machine (M2M) type devices and network.

FIG. 1 is an example depiction of machine-to-machine (M2M) type devices 12, 14, and 16, and network 18. As shown in FIG. 1, devices 12, 14, and 16 can communication directly and/or via a network 18 to other devices, entities, etc. Devices 12, 14, and 16 represent any appropriate M2M type devices. Example M2M devices include eReaders like the KINDLE or the NOOK, temperature sensors, water meters, electric meters, gas meters, and in-vehicle automotive systems (e.g., navigation aids, emergency notification), medical monitoring, security systems, tracking devices, or the like. Devices 12, 14, and 16 can acquire information (e.g., temperature, water usage, electrify, gas usage, documents, etc.) and provide the information to other devices. When in close proximity and configured to directly communication with other M2M type devices, M2M devices can provide information to other M2M type devices directly. If not in close proximity and/or if not configured to directly communication with other M2M type devices, M2M devices can provide information via a network, such as network, 18, for example. The network 18 represents any appropriate wireless and/or wired networks or networks.

When communicating via a network, an M2M type device can initiate transmission/reception of information, or can be requested to transmit/receive information via the network. In example embodiments, a wireless operator, or the like, connects to an M2M type device in order to send the M2M type device new configuration data, software, or the like. Also, the wireless operator, or the like, can connect to an M2M type device in order to retrieve information, such as current meter readings from water, electric, or gas meters, for example.

To mitigate the impact on network usage and/or the impact on network resources, M2M type devices may not have active data sessions established at all times. Instead, M2M type devices can monitor control channels and establish data sessions when triggered by other activities such as receiving a Short Message Service (SMS) message and/or a cell broadcast message. When a connection is initiated, the information that the M2M device has been collecting and storing can transmitted to the network for delivering to the service/server which receives and processed the transmitted information. For example, a cell broadcast message can be sent from cellular sites covering a residential area requesting that water meters provide their respective current meter readings. In this example scenario, devices 12, 14, and 16 could represent water meters, and network 18 could represent the telecommunications network comprising the cellular sites. If all the devices connected (established call/data sessions) to the network at the same time, network congestion could occur. Distributing the connection times could alleviate and/or prevent network congestion.

Figure 2:
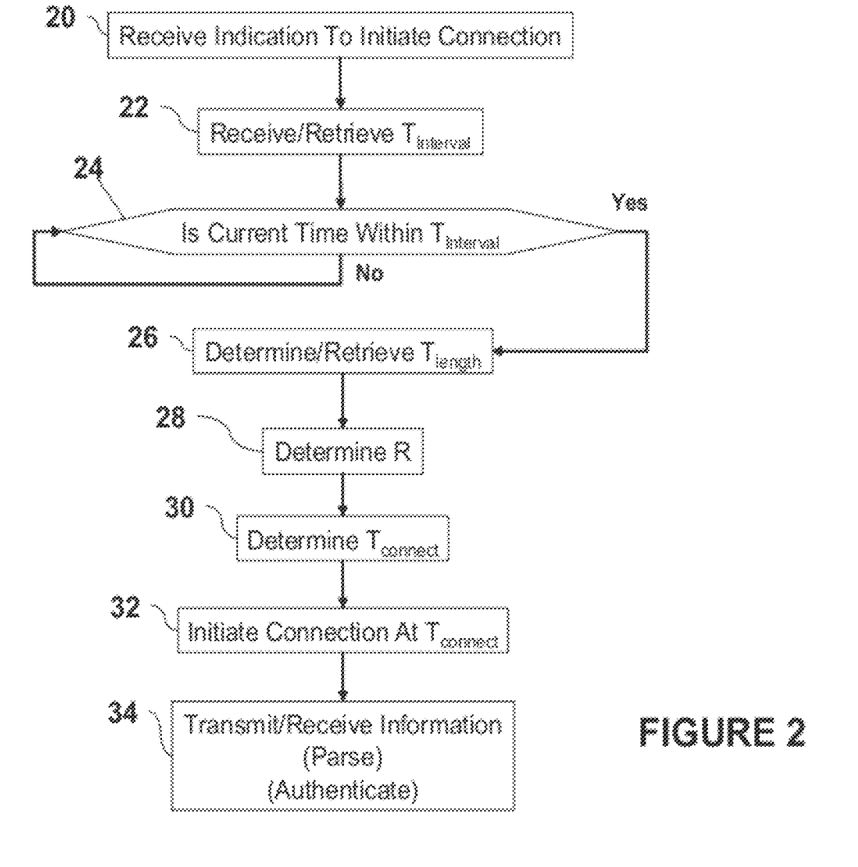
FIG. 2 is a flow diagram of an example process for distributing M2M connections.

FIG. 2 is a flow diagram of an example process for distributing M2M connections. An indication to initiate a connection (e.g., establish a data and/or call session) to a network or another device is received, by a device, at step 20. The indication can be received from a network, from another device, or from the device being indicated to initiate a connection. For example, the indication can be a broadcast message from a network, a point-to-point message from a network, an SMS message, a message from another device, or an indication from the device itself, to initiate a connection.

The time interval ($T_{interval}$) for establishing the connection is received and/or retrieved at step 22. The time interval, $T_{interval}$, can be for a specific duration from a start time, $T_{start}$, such as a number of hours (e.g., 4 hours from a date and time), or can be for specific times having a start time and an end time, $T_{end}$ (e.g., the next occurrence of midnight to 4 AM). The time interval, $T_{interval}$, can be retrieved from storage on the device or external storage not on the device. For example, the time interval, $T_{interval}$, can be preconfigured and stored on an M2M type device (or external storage such a database or the like), and retrieved in response to receiving the indication to initiate a connection. The time interval, $T_{interval}$, can be received via a triggering event such as a triggering SMS message and/or cell broadcast message. Thus, the time interval, $T_{interval}$, could be included in the indication to initiate a connection.

The start time, $T_{Start}$, can be a date and time value that is preconfigured and stored on the M2M type device. The start time, $T_{Start}$, represents the beginning of the time interval, $T_{interval}$. The start time, $T_{Start}$, can be a date and time value that is received via the indication to initiate a connection. If there is no start time, $T_{Start}$, stored on the M2M type device, and if there is no start time in the indication to initiate a connection, the start time of the interval can be the time at which the indication to initiate a connection is received. For M2M type devices that do not have date and time functions, the start time, $T_{Start}$, can be the time at which the indication to initiate a connection is received. In an example embodiment, each M2M type device could have assigned thereto, its own start time, $T_{start}$.

At step 24, if the device receiving the indication to initiate a connection has the ability to determine the current time, such as a clock or the like, it is determined if the current time is within the time interval, time interval, $T_{interval}$. If the time interval, $T_{interval}$, was provided/retrieved as a period of time having a start time and an end time, the current time is compared to the start time and end time to determine if the current time falls within the limits of the start time and end time (inclusively). If the time interval, $T_{interval}$, was provided/retrieved as a length of time and a start time, the length of time is added to the start time to determine the end time. And, the current time is compared to the start time and end time to determine if the current time falls within the limits of the start time and end time (inclusively). If the current time is not within the time interval, $T_{interval}$, the process remains at step 24, and continues to determine if the current time is within the time interval, time interval, $T_{interval}$. If the current time is within the time interval, $T_{interval}$, the process proceeds to step 26. If the device receiving the indication to initiate a connection does not have a clock or the like, step 24 is skipped and the process proceeds to step 26.

The value ($T_{length}$) of the length of the time interval, $T_{interval}$, is determined at step 26. The value, $T_{length}$, can be preconfigured and stored on the device or external storage, can be included in the indication to initiate a connection (e.g., triggering event, such as a triggering SMS message and/or cell broadcast message), or can be calculated from the interval start and end times. For example, the value, $T_{length}$, can be preconfigured and stored on an M2M type device (or external storage such a database or the like), and retrieved. The value, $T_{length}$, can be determined by subtracting the start time from the end time ($T_{end}-T_{start}$).

The end time, $T_{end}$, is the date and time of the end of the time interval, $T_{interval}$. The end time can be a preconfigured value on the M2M time and/or it can be a date and time value received via the triggering SMS or cell broadcast message. This value could also be calculated from the start time $T_{start}$, and the interval length, $T_{length}$. The end time, $T_{end}$, can be a date and time value that is received via the indication to initiate a connection. If there is no end time, $T_{end}$, stored on the M2M type device and/or external storage, and if there is no end time in the indication to initiate a connection, the end time of the interval can be calculated from the start time $T_{start}$, and the interval length, $T_{length}$ by adding the start time $T_{start}$ and the interval length, $T_{length}$.

A random number value, R, is randomly determined at step 28. The random number value, R, can comprise any appropriate random number value. For example, the random number value, R, can be a value generated by a random number generator, a value generated by a pseudorandom number generator, a value based on the M2M type device (e.g., device ID, device serial number, device model number, a hash of a device ID, a hash of a device serial number, a hash of a device model number, an encrypted value, etc.) that is being indicated to initiate a connection, or the like. For example, the random number value, R, can be generated by a random number generator that requires a seed. The seed can be generated by encrypting, hashing, or a combination of encryption and hashing a value and/or data associated with the M2M device. Data can include a device number or identifier, a time value, or the like. In an example embodiment, the random number value, R, is randomly determined to have a value between 0 and 1, inclusive.

The connection time, $T_{connect}$, is determined at step 30. The connection time, $T_{connect}$, is the time at which the device initiates the connection (e.g., the time at which the device initiates a data and/or call session). For M2M type devices having the ability to determine date and time, the connection time, $T_{connect}$, is determined in accordance with equation (1).

$$T_{connect}=T_{start}+(R*T_{length}), \quad (1)$$

where R represents a random value number between zero and one (inclusive). Or, expressed mathematically: $0 \le R \le 1$.

In example embodiments, the random value number can be within any appropriate numerical limits and normalized accordingly, such that the normalized value is between zero and one, inclusive. For example, as shown in equation (2), the value of the random number, R, is between 0 and 100.

$$T_{connect}=T_{start}+(R/100*T_{length}), \quad (2)$$

where R represents a random value number between zero and one hundred (inclusive). Or, expressed mathematically: $0 \le R \le 100$. Normalizing R in this manner may facilitate uniform distribution of the transmissions across the time interval.

For M2M type devices that do not have the ability to determine date and time, the connection time, $T_{connect}$, is determined in accordance with equation (3).

$$T_{connect}=T_{delay}+T_{start}, \quad (3)$$

where the start time, $T_{start}$, would be retrieved from storage and/or provided in the indication to initiate a connection, and $T_{delay}$ represents a delay time period from the start time. In an example embodiment, the delay time, $T_{delay}$, could be provided with the indication to initiate a connection. In another example embodiment, the delay time, $T_{delay}$, can be determined in accordance with equation (4).

$$T_{delay}=(R*T_{length}), \quad (4)$$

Upon a connection being established (e.g., a data and/or call session being established), information is transmitted or received by the M2M type device at step 34. For example, referring to the aforementioned water meter scenario, the M2M type device, being a water meter, could transmit water usage information at step 34. In an example embodiment, the information to be transmitted (either to or from the M2M type device) could be parsed into portions, and each parsed portion could be transmitted randomly within a time interval as described above. That is, the above process described with reference to FIG. 2 pertaining to randomized connection times could also appropriately be utilized to determined randomized transmission times.

In an example embodiment, transmissions (either to or from the M2M type device) can be authenticated at step 34 by comparing a received hash value or other unique identifier and/or time value. A hash function is a function that converts a variable length input into a fixed length output, referred to as the hash value. Within mathematical limits, two different inputs to a hash function will not result in the same hash value. In an exemplary embodiment, a cryptographic hash function, such as MD5 or SHA-1 for example, can be used. For example, once a start time is established, the start time can be used for authentication. For example, the start time could be hashed. The resulting hash value could be encrypted and the encrypted value could be transmitted. Any appropriate encryption technique could be used. For example the RSA cryptographic algorithm could be used. The RSA is used primarily for public key cryptography. Other algorithms such as DES (Data Encryption Standard), Triple DES, AES (Advanced Encryption Standard), etc. could be used. The receiving entity could decrypt the encrypted value to obtain the hash value. The obtained hash value could be compared with a known hash value to authenticate the transmission. The known hash value being a hash of the known start time. As another example, a serial number of an M2M type device and its start time could be combined (e.g., concatenated) and the combination could be hashed. The resulting hash value could be encrypted and the encrypted value could be transmitted. The receiving entity could decrypt the encrypted value to obtain the hash value. The obtained hash value could be compared with a known hash value to authenticate the transmission. The known hash value being a hash of a combination of the known start time and the known M2M type device serial number.

Figure 3:
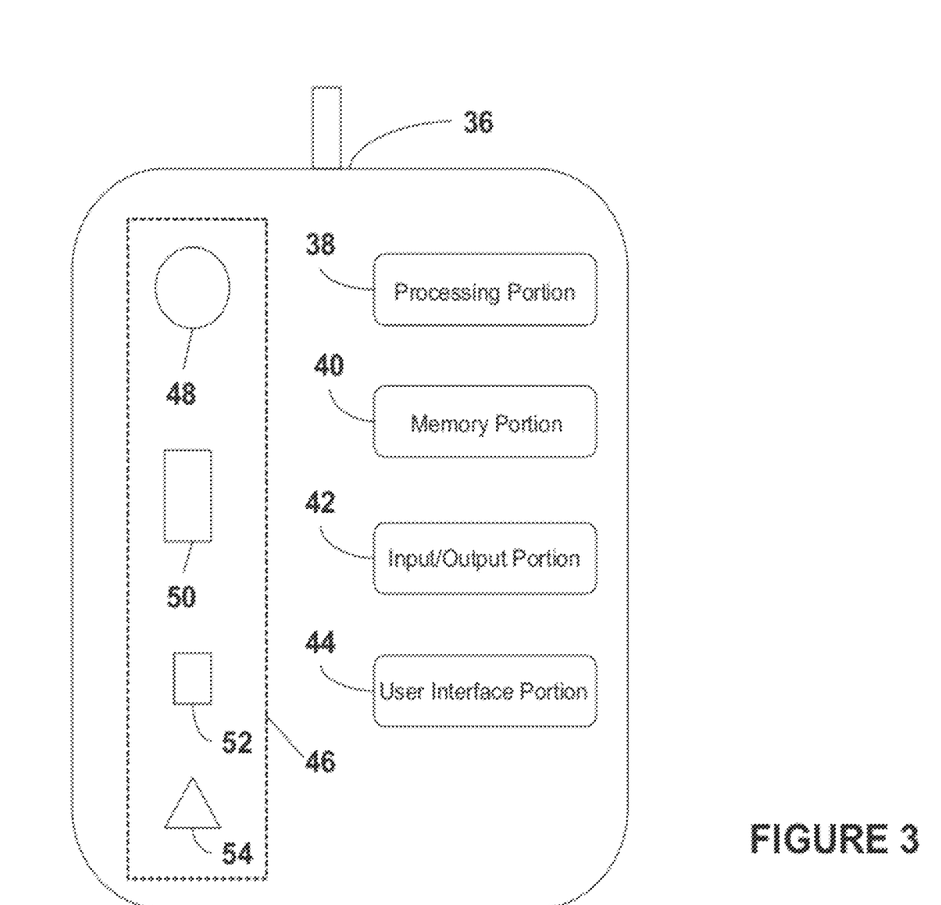
FIG. 3 is a block diagram of an example M2M type device that is configurable to distribute connectivity and/or transmission time.

FIG. 3 is a block diagram of an example M2M type device 36 that is configurable to distribute connectivity and/or transmission time. The M2M type device 36 can include any appropriate device, mechanism, software, and/or hardware for distributing connectivity and/or transmission time as described herein. As described herein, the M2M type device 36 comprises hardware, or a combination of hardware and software. And, each portion of the M2M type device 36 comprises hardware, or a combination of hardware and software. In an example configuration, the M2M type device 36 can comprise a processing portion 38, a memory portion 40, an input/output portion 42, a user interface (UI) portion 44, and a sensor portion 46 comprising at least one of a video camera portion 48, a force/wave sensor 50, a microphone 52, a moisture sensor 54, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 54 is capable of detecting moisture, such as detecting if the M2M type device 36 is submerged in a liquid. The processing portion 38, memory portion 40, input/output portion 42, user interface (UI) portion 44, video camera portion 48, force/wave sensor 50, and microphone 52 are coupled together to allow communications therebetween (coupling not shown in FIG. 3). The M2M type device 36 also can comprise a timer (not depicted in FIG. 3).

In various embodiments, the input/output portion 42 comprises a receiver of the M2M type device 36, a transmitter of the M2M type device 36, or a combination thereof. The input/output portion 42 is capable of receiving and/or providing information pertaining to distributing connectivity and/or transmission time as described herein. The input/output portion 42 also is capable of communications other M2M type devices with networks as described herein. For example, the input/output portion 42 can include a wireless communications (e.g., 2.5G/3G/4G) SIM card. The input/output portion 42 is capable of receiving and/or sending text information, video information, audio information, control information, image information, data, an indication to initiate a connection, an indication to initiate a transmission, start time information, end time information, interval time information, interval length information, random number value information, connect time information, transmit time information, parsing information, authentication information, or any combination thereof. In an example embodiment, the input/output portion 42 is capable of receiving and/or sending information to determine a location of the M2M type device 36. In an example configuration, the input\output portion 42 comprises a GPS receiver. In an example configuration, the M2M type device 36 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 42 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 38 is capable of distributing connectivity and/or transmission time as described herein. For example, the processing portion 38 is capable of, in conjunction with any other portion of the M2M type device 36 as needed, executing an application for facilitating distributing connectivity and/or transmission time, determining a start time, determining an end time, determining an interval time, determining a random number value, determining a connect time, determining a transmission time, parsing information, authenticating information, hashing information, encrypting information, generating a text message, generating a voice message, processing a received text message, processing a received voice message, retrieving a predetermined message, processing text messages provided via the user interface portion 44, processing voice messages provided via the user interface portion 44, processing text messages received via the input/output portion 42, processing voice messages received via the input/output portion 42, or the like, or any combination thereof. The processing portion 38, in conjunction with any other portion of the M2M type device 36 as needed, can provide the ability for users/subscribers to enable, disable, and configure various features of an application for determining if non-voice emergency services are available, as described herein. The processing portion 38, in conjunction with any other portion of the M2M type device 36, enables the M2M type device 36 to covert speech to text or convert text to speech.

In a basic configuration, the M2M type device 36 can include at least one memory portion 40. The memory portion 40 can store any information utilized in conjunction with distributing connectivity and/or transmission time as described herein. For example, the memory portion 40 is capable of storing information pertaining to a start time, an end time, an interval time, a random number value, a connect time, a transmission time, parsing information, authenticating information, hashing information, encrypting information, a location of a device, a predetermined text/voice message, a text/voice message, a predetermined audio/text message, an audio/text message, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of processor, the memory portion 40 can be volatile (such as some types of RAM), non-volatile (such as ROM, flash memory, etc.). The M2M type device 36 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 40, or a portion of the memory portion 38 is hardened such that information stored therein can be recovered if the M2M type device 36 is exposed to extreme heat, extreme vibration, extreme moisture, corrosive chemicals or gas, or the like. In an example configuration, the information stored in the hardened portion of the memory portion 40 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 40 intelligible.

The M2M type device 36 also can contain a UI portion 44 allowing a user to communicate with the M2M type device 36. The UI portion 44 is capable of rendering any information utilized in conjunction distributing connectivity and/or transmission time as described herein. For example, the UI portion 44 can provide means for entering text (including numbers), entering a phone number, rendering text, rendering images, rendering multimedia, rendering sound, rendering video, receiving sound, or the like, as described herein. The UI portion 44 can provide the ability to control the M2M type device 36, via, for example, buttons, soft keys, voice actuated controls, a touch screen, movement of the mobile M2M type device 36, visual cues (e.g., moving a hand in front of a camera on the mobile M2M type device 36), or the like. The UI portion 44 can provide visual information (e.g., via a display), audio information (e.g., via speaker), mechanically (e.g., via a vibrating mechanism), or a combination thereof. In various configurations, the UI portion 44 can comprise a display, a touch screen, a keyboard, a speaker, or any combination thereof. The UI portion 44 can comprise means for inputting biometric information, such as, for example, fingerprint information, retinal information, voice information, and/or facial characteristic information. The UI portion 44 can be utilized to enter an indication of the designated destination (e.g., the phone number, IP address, or the like).

In an example embodiment, the sensor portion 46 of the M2M type device 36 comprises the video camera portion 48, the force/wave sensor 50, and the microphone 52. The video camera portion 48 comprises a camera (or cameras) and associated equipment capable of capturing still images and/or video and to provide the captured still images and/or video to other portions of the M2M type device 36. In an example embodiment, the force/wave sensor 50 comprises an accelerometer, a tilt sensor, an acoustic sensor capable of sensing acoustic energy, an optical sensor (e.g., infrared), or any combination thereof.

Figure 4:
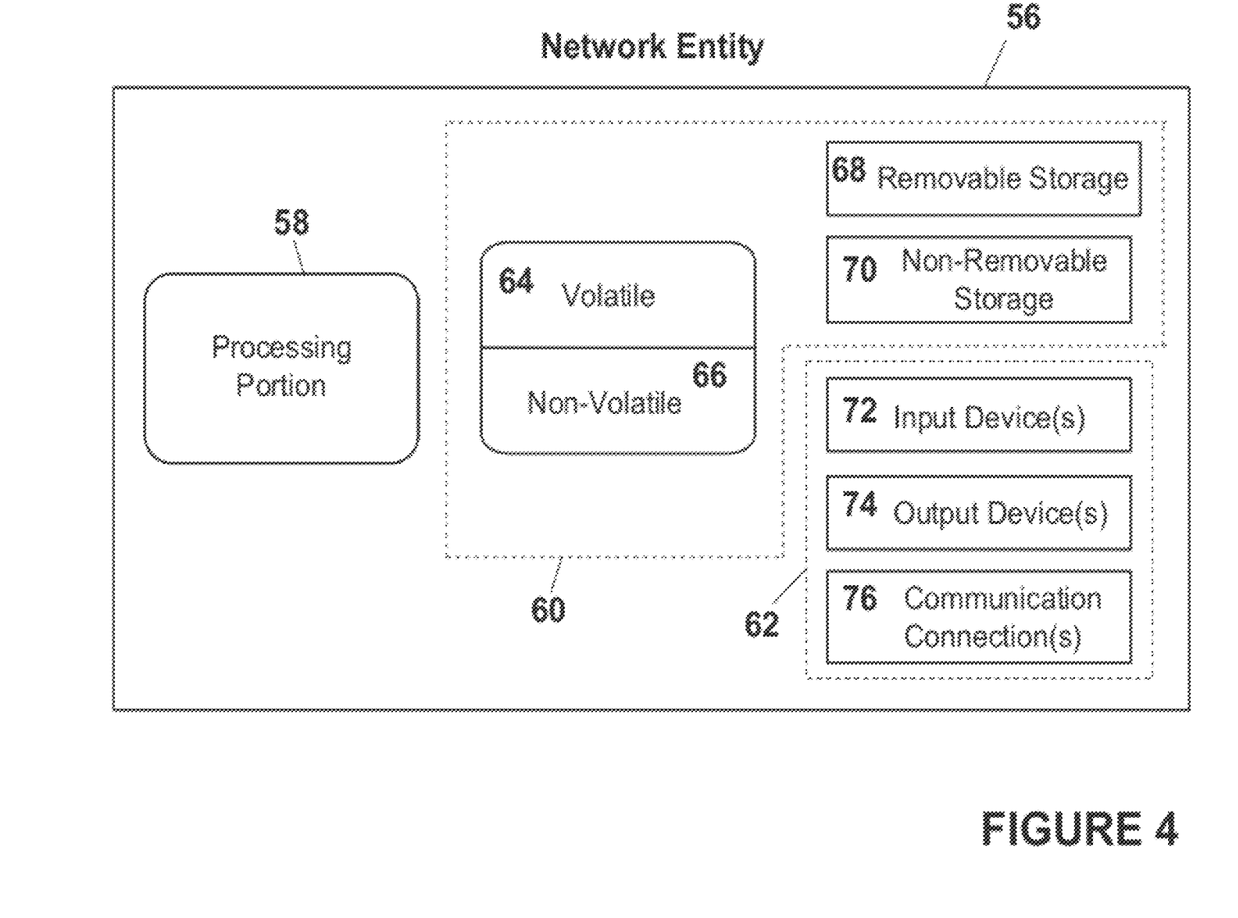
FIG. 4 is a block diagram of an example network entity configurable to facilitate distributing connectivity and/or transmission time.

FIG. 4 is a block diagram of an example network entity 56 configurable to facilitate distributing connectivity and/or transmission time as described herein. In an example embodiment, the network entity 56 comprises a network entity comprising hardware, or a combination of hardware and software. And, each portion of the network entity 56 comprises hardware, or a combination of hardware and software. When used in conjunction with a network, the functionality needed to facilitate distributing connectivity and/or transmission time can reside in any one or combination of network entities. The network entity 56 depicted in FIG. 4 represents any appropriate network entity, apparatus, or combination of network entities or apparatuses, such as a processor, a server, a gateway, etc., or any combination thereof. It is emphasized that the block diagram depicted in FIG. 4 is exemplary and not intended to imply a specific implementation or configuration. Thus, the network entity 56 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 56 comprises a processing portion 58, a memory portion 60, and an input/output portion 62. The processing portion 58, memory portion 60, and input/output portion 62 are coupled together (coupling not shown in FIG. 4) to allow communications therebetween. The input/output portion 62 is capable of receiving and/or providing information from/to a device (e.g., M2M type device 36) and/or other network entity configured to be utilized when distributing connectivity and/or transmission time. For example, the input/output portion 62 is capable of, in conjunction with any other portion of the network entity 56 as needed, receiving and/or sending text information, video information, audio information, control information, image information, data, an indication to initiate a connection, an indication to initiate a transmission, start time information, end time information, interval time information, interval length information, random number value information, connect time information, transmit time information, parsing information, authentication information, or the like, or any combination thereof.

The processing portion 58 is capable of performing functions associated with distributing connectivity and/or transmission time, as described herein. For example, the processing portion 58 is capable of, in conjunction with any other portion of the network entity 56 as needed, executing an application for facilitating distributing connectivity and/or transmission time, determining a start time, determining an end time, determining an interval time, determining a random number value, determining a connect time, determining a transmission time, parsing information, authenticating information, hashing information, encrypting information, generating a text message, generating a voice message, processing a received text message, processing a received voice message, retrieving a predetermined message, processing text messages provided via the user interface portion 44, processing voice messages provided via the user interface portion 44, processing text messages received via the input/output portion 42, processing voice messages received via the input/output portion 42, or the like, or any combination thereof.

The memory portion 60 can store any information utilized in conjunction with distributing connectivity and/or transmission time, as described herein. For example, the memory portion 60 is capable of storing information pertaining to a start time, an end time, an interval time, a random number value, a connect time, a transmission time, parsing information, authenticating information, hashing information, encrypting information, a location of a device, a predetermined text/voice message, a text/voice message, a predetermined audio/text message, an audio/text message, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of network entity 56, the memory portion 60 can include a computer storage medium, or media, that is volatile 64 (such as dynamic RAM), non-volatile 66 (such as ROM), or a combination thereof. The network entity 56 can include additional storage, in the form of computer storage media (e.g., removable storage 68 and/or non-removable storage 70) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture.

The network entity 56 also can contain communications connection(s) 76 that allow the network entity 56 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The network entity 56 also can include input device(s) 72 such as keyboard, mouse, pen, voice input device, touch input device, an optical input device, etc. Output device(s) 74 such as a display, speakers, printer, mechanical vibrators, etc. also can be included.

The communications device (e.g., M2M type devices 36, 12, 14, 16) and the network entity (network entity 56) can be part of and/or in communication with various wireless communications networks. Some of which are described below.

Figure 5:
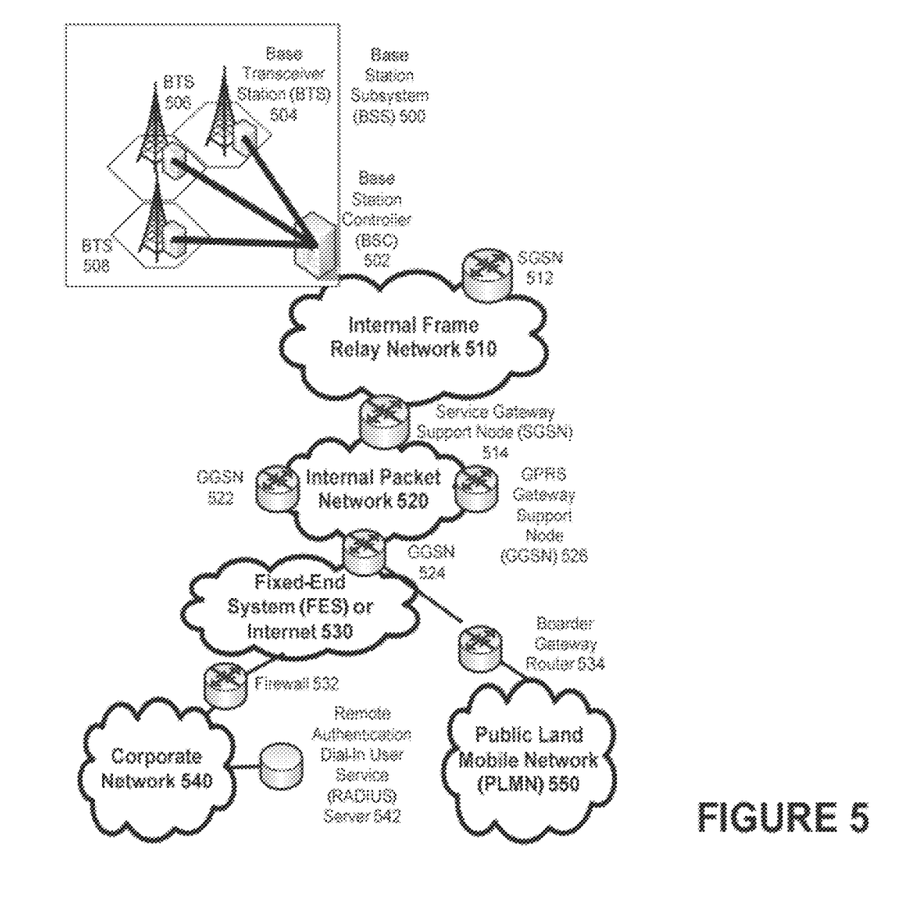
FIG. 5 depicts an overall block diagram of an exemplary packet-based mobile cellular network environment, such as a GPRS network, in which distribution of connectivity and/or transmission time can be implemented.

FIG. 5 depicts an overall block diagram of an exemplary packet-based mobile cellular network environment, such as a GPRS network, in which distribution of connectivity and/or transmission time can be implemented. In the exemplary packet-based mobile cellular network environment shown in FIG. 5, there are a plurality of Base Station Subsystems ("BSS") 500 (only one is shown), each of which comprises a Base Station Controller ("BSC") 502 serving a plurality of Base Transceiver Stations ("BTS") such as BTSs 504, 506, and 508. BTSs 504, 506, 508, etc. are the access points where users of packet-based mobile devices become connected to the wireless network. In exemplary fashion, the packet traffic originating from user devices is transported via an over-the-air interface to a BTS 508, and from the BTS 508 to the BSC 502. Base station subsystems, such as BSS 500, are a part of internal frame relay network 510 that can include Service GPRS Support Nodes ("SGSN") such as SGSN 512 and 514. Each SGSN is connected to an internal packet network 520 through which a SGSN 512, 514, etc. can route data packets to and from a plurality of gateway GPRS support nodes (GGSN) 522, 524, 526, etc. As illustrated, SGSN 514 and GGSNs 522, 524, and 526 are part of internal packet network 520. Gateway GPRS serving nodes 522, 524 and 526 mainly provide an interface to external Internet Protocol ("IP") networks such as Public Land Mobile Network ("PLMN") 550, corporate intranets 540, or Fixed-End System ("FES") or the public Internet 530. As illustrated, subscriber corporate network 540 may be connected to GGSN 524 via firewall 532; and PLMN 550 is connected to GGSN 524 via boarder gateway router 534. The Remote Authentication Dial-In User Service ("RADIUS") server 542 may be used for caller authentication when a user of a mobile cellular device calls corporate network 540.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
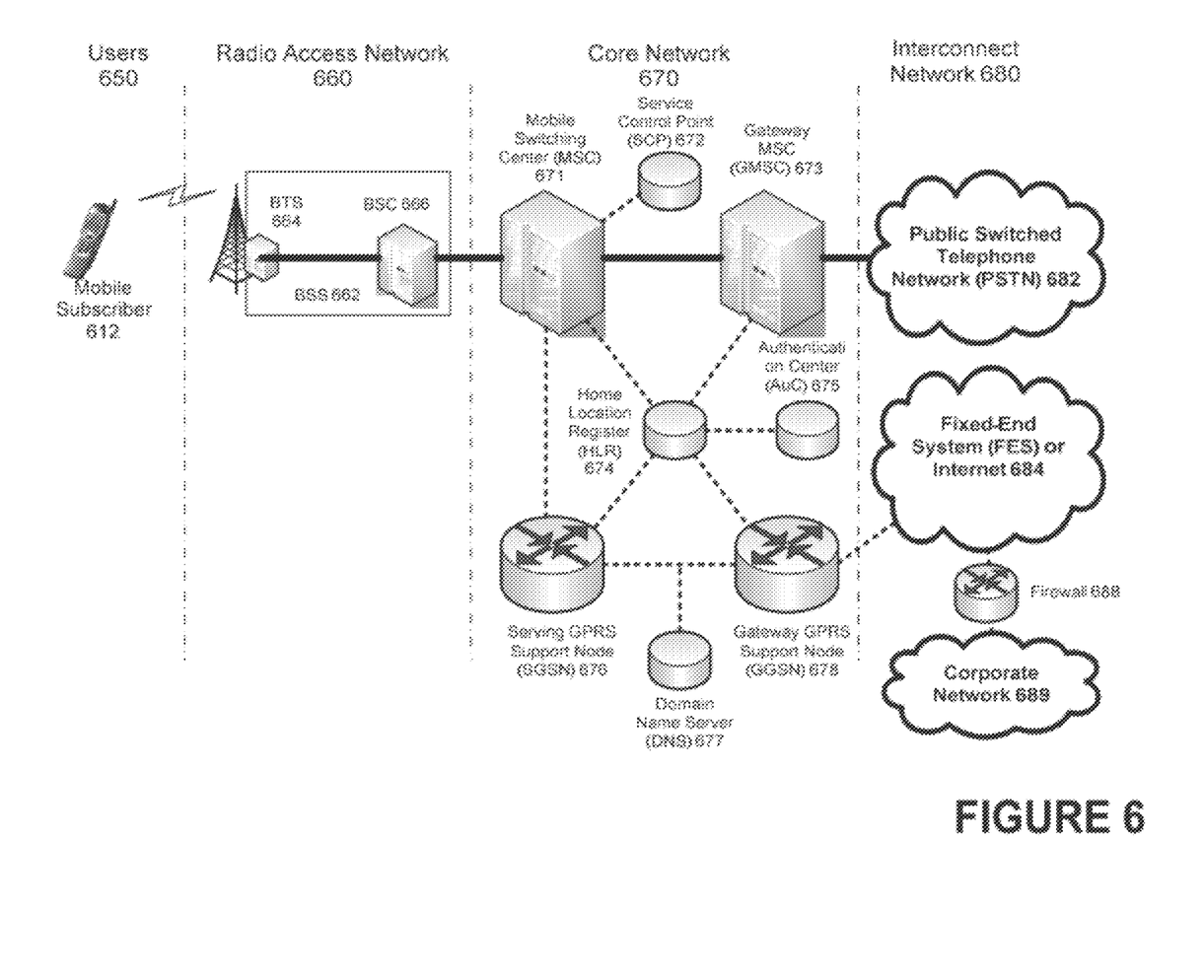
FIG. 6 illustrates an architecture of a typical GPRS network in which distribution of connectivity and/or transmission time can be implemented.

FIG. 6 illustrates an architecture of a typical GPRS network in which distribution of connectivity and/or transmission time can be implemented. The architecture depicted in FIG. 6 is segmented into four groups: users 650, radio access network 660, core network 670, and interconnect network 680. Users 650 comprise a plurality of end users. Note, device 612 is referred to as a mobile subscriber in the description of network shown in FIG. 6. In an example embodiment, the device depicted as mobile subscriber 612 comprises a communications device (e.g., wireless anti-theft security M2M type device 36). Radio access network 660 comprises a plurality of base station subsystems such as BSSs 662, which include BTSs 664 and BSCs 666. Core network 670 comprises a host of various network elements. As illustrated in FIG. 6, core network 670 may comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 also comprises a host of various networks and other network elements. As illustrated in FIG. 6, interconnect network 680 comprises Public Switched Telephone Network ("PSTN") 682, Fixed-End System ("FES") or Internet 684, firewall 688, and Corporate Network 689.

A mobile switching center can be connected to a large number of base station controllers. At MSC 671, for instance, depending on the type of traffic, the traffic may be separated in that voice may be sent to Public Switched Telephone Network ("PSTN") 682 through Gateway MSC ("GMSC") 673, and/or data may be sent to SGSN 676, which then sends the data traffic to GGSN 678 for further forwarding.

When MSC 671 receives call traffic, for example, from BSC 666, it sends a query to a database hosted by SCP 672. The SCP 672 processes the request and issues a response to MSC 671 so that it may continue call processing as appropriate.

The HLR 674 is a centralized database for users to register to the GPRS network. HLR 674 stores static information about the subscribers such as the International Mobile Subscriber Identity ("IMSI"), subscribed services, and a key for authenticating the subscriber. HLR 674 also stores dynamic subscriber information such as the current location of the mobile subscriber. Associated with HLR 674 is AuC 675. AuC 675 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 612 initiates the attach process by turning on the network capabilities of the mobile device, an attach request is sent by mobile subscriber 612 to SGSN 676. The SGSN 676 queries another SGSN, to which mobile subscriber 612 was attached before, for the identity of mobile subscriber 612. Upon receiving the identity of mobile subscriber 612 from the other SGSN, SGSN 676 requests more information from mobile subscriber 612. This information is used to authenticate mobile subscriber 612 to SGSN 676 by HLR 674. Once verified, SGSN 676 sends a location update to HLR 674 indicating the change of location to a new SGSN, in this case SGSN 676. HLR 674 notifies the old SGSN, to which mobile subscriber 612 was attached before, to cancel the location process for mobile subscriber 612. HLR 674 then notifies SGSN 676 that the location update has been performed. At this time, SGSN 676 sends an Attach Accept message to mobile subscriber 612, which in turn sends an Attach Complete message to SGSN 676.

After attaching itself with the network, mobile subscriber 612 then goes through the authentication process. In the authentication process, SGSN 676 sends the authentication information to HLR 674, which sends information back to SGSN 676 based on the user profile that was part of the user's initial setup. The SGSN 676 then sends a request for authentication and ciphering to mobile subscriber 612. The mobile subscriber 612 uses an algorithm to send the user identification (ID) and password to SGSN 676. The SGSN 676 uses the same algorithm and compares the result. If a match occurs, SGSN 676 authenticates mobile subscriber 612.

Next, the mobile subscriber 612 establishes a user session with the destination network, corporate network 689, by going through a Packet Data Protocol ("PDP") activation process. Briefly, in the process, mobile subscriber 612 requests access to the Access Point Name ("APN"), for example, UPS.com, and SGSN 676 receives the activation request from mobile subscriber 612. SGSN 676 then initiates a Domain Name Service ("DNS") query to learn which GGSN node has access to the UPS.com APN. The DNS query is sent to the DNS server within the core network 670, such as DNS 677, which is provisioned to map to one or more GGSN nodes in the core network 670. Based on the APN, the mapped GGSN 678 can access the requested corporate network 689. The SGSN 676 then sends to GGSN 678 a Create Packet Data Protocol ("PDP") Context Request message that contains necessary information. The GGSN 678 sends a Create PDP Context Response message to SGSN 676, which then sends an Activate PDP Context Accept message to mobile subscriber 612.

Once activated, data packets of the call made by mobile subscriber 612 can then go through radio access network 660, core network 670, and interconnect network 680, in a particular fixed-end system or Internet 684 and firewall 688, to reach corporate network 689.

Figure 7:
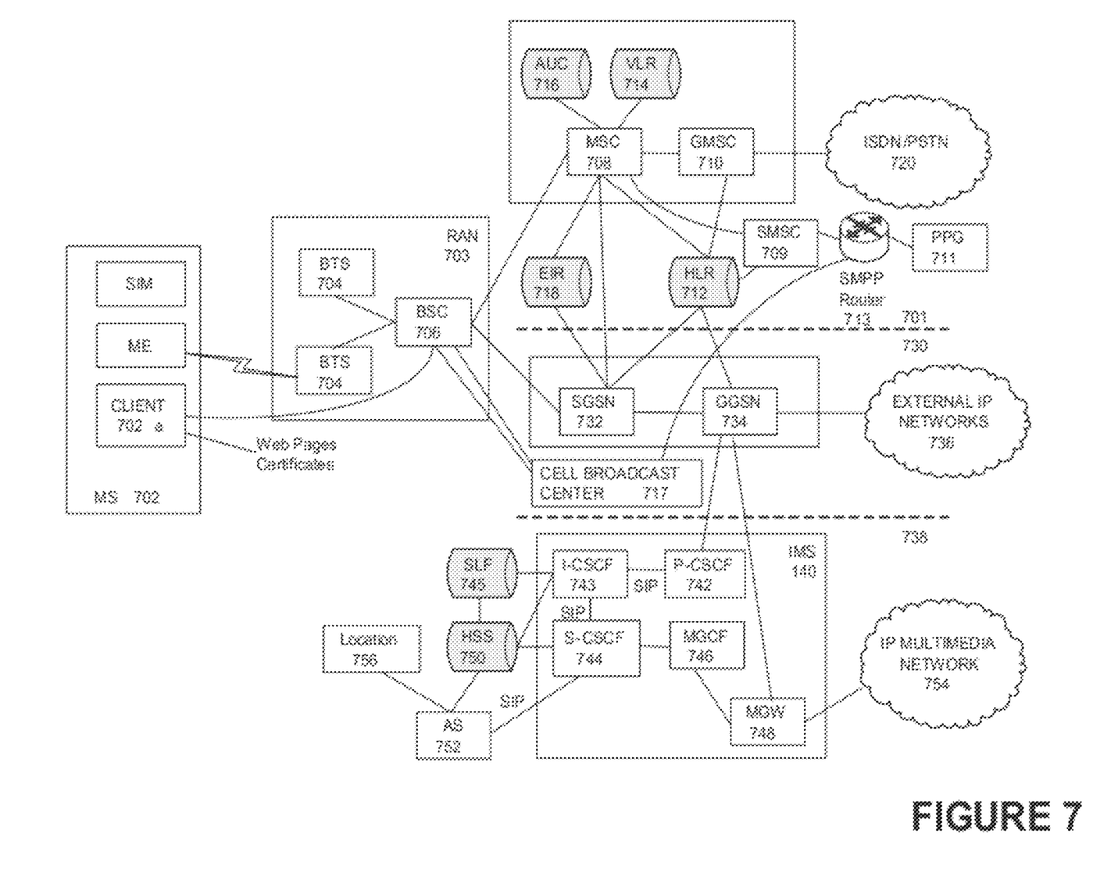
FIG. 7 illustrates an exemplary block diagram view of a GSM/GPRS/IP multimedia network architecture within which distribution of connectivity and/or transmission time can be implemented.

FIG. 7 illustrates an exemplary block diagram view of a GSM/GPRS/IP multimedia network architecture within which distribution of connectivity and/or transmission time can be implemented. As illustrated, the architecture of FIG. 7 includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 704 is physical equipment, such as a radio tower, that enables a radio interface to communicate with the MS. Each BTS may serve more than one MS. The BSC 706 manages radio resources, including the BTS. The BSC may be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. Thus, the GMSC 710 provides interworking functionality with external networks.

The HLR 712 is a database that contains administrative information regarding each subscriber registered in a corresponding GSM network. The HLR 712 also contains the current location of each MS. The VLR 714 is a database that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AuC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (i.e., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 717 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interworking functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 738 was introduced with 3GPP Release 7, and includes an IP multimedia subsystem (IMS) 740 to provide rich multimedia services to end users. A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 may be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 may also modify an outgoing request according to a set of rules defined by the network operator (for example, address analysis and potential modification).

The I-CSCF 743, forms an entrance to a home network and hides the inner topology of the home network from other networks and provides flexibility for selecting an S-CSCF. The I-CSCF 743 may contact a subscriber location function (SLF) 745 to determine which HSS 750 to use for the particular subscriber, if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown). It also controls the media gateway (MGW) 748 that provides user-plane interworking functionality (e.g., converting between AMR- and PCM-coded voice). The MGW 748 also communicates with other IP multimedia networks 754.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
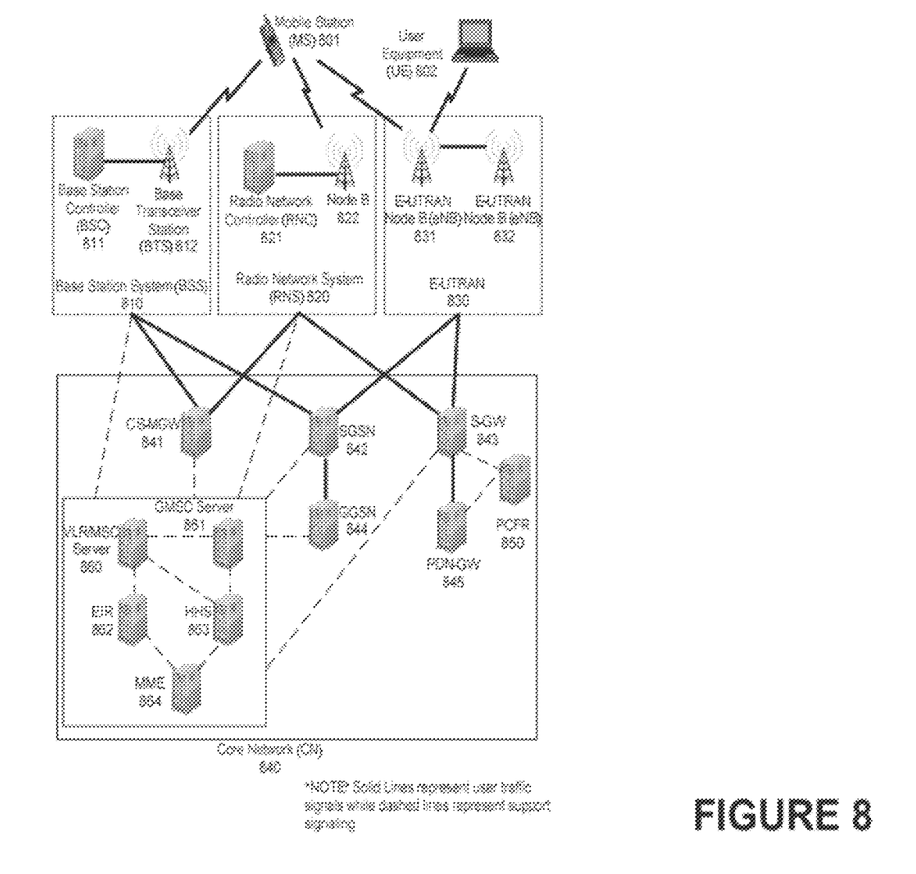
FIG. 8 illustrates a PLMN block diagram view of an exemplary architecture in which distribution of connectivity and/or transmission time may be incorporated.

FIG. 8 illustrates a PLMN block diagram view of an exemplary architecture in which distribution of connectivity and/or transmission time may be incorporated. Mobile Station (MS) 801 is the physical equipment used by the PLMN subscriber. In one illustrative embodiment, communications device 40 may serve as Mobile Station 801. Mobile Station 801 may be one of, but not limited to, a cellular telephone, a cellular telephone in combination with another electronic device or any other wireless mobile communication device.

Mobile Station 801 may communicate wirelessly with Base Station System (BSS) 810. BSS 810 contains a Base Station Controller (BSC) 811 and a Base Transceiver Station (BTS) 812. BSS 810 may include a single BSC 811/BTS 812 pair (Base Station) or a system of BSC/BTS pairs which are part of a larger network. BSS 810 is responsible for communicating with Mobile Station 801 and may support one or more cells. BSS 810 is responsible for handling cellular traffic and signaling between Mobile Station 801 and Core Network 840. Typically, BSS 810 performs functions that include, but are not limited to, digital conversion of speech channels, allocation of channels to mobile devices, paging, and transmission/reception of cellular signals.

Additionally, Mobile Station 801 may communicate wirelessly with Radio Network System (RNS) 820. RNS 820 contains a Radio Network Controller (RNC) 821 and one or more Node(s) B 822. RNS 820 may support one or more cells. RNS 820 may also include one or more RNC 821/Node B 822 pairs or alternatively a single RNC 821 may manage multiple Nodes B 822. RNS 820 is responsible for communicating with Mobile Station 801 in its geographically defined area. RNC 821 is responsible for controlling the Node(s) B 822 that are connected to it and is a control element in a UMTS radio access network. RNC 821 performs functions such as, but not limited to, load control, packet scheduling, handover control, security functions, as well as controlling Mobile Station 801's access to the Core Network (CN) 840.

The evolved UMTS Terrestrial Radio Access Network (E-UTRAN) 830 is a radio access network that provides wireless data communications for Mobile Station 801 and User Equipment 802. E-UTRAN 830 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 830 may include of series of logical network components such as E-UTRAN Node B (eNB) 831 and E-UTRAN Node B (eNB) 832. E-UTRAN 830 may contain one or more eNBs. User Equipment 802 may be any user device capable of connecting to E-UTRAN 830 including, but not limited to, a personal computer, laptop, mobile device, wireless router, or other device capable of wireless connectivity to E-UTRAN 830. The improved performance of the E-UTRAN 830 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 801 may communicate with any or all of BSS 810, RNS 820, or E-UTRAN 830. In a illustrative system, each of BSS 810, RNS 820, and E-UTRAN 830 may provide Mobile Station 801 with access to Core Network 840. The Core Network 840 may include of a series of devices that route data and communications between end users. Core Network 840 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 841 is part of Core Network 840, and interacts with Visitor Location Register (VLR) and Mobile-Services Switching Center (MSC) Server 860 and Gateway MSC Server 861 in order to facilitate Core Network 840 resource control in the CS domain. Functions of CS-MGW 841 include, but are not limited to, media conversion, bearer control, payload processing and other mobile network processing such as handover or anchoring. CS-MGW 840 may receive connections to Mobile Station 801 through BSS 810, RNS 820 or both.

Serving GPRS Support Node (SGSN) 842 stores subscriber data regarding Mobile Station 801 in order to facilitate network functionality. SGSN 842 may store subscription information such as, but not limited to, the International Mobile Subscriber Identity (IMSI), temporary identities, or Packet Data Protocol (PDP) addresses. SGSN 842 may also store location information such as, but not limited to, the Gateway GPRS Support Node (GGSN) 844 address for each GGSN where an active PDP exists. GGSN 844 may implement a location register function to store subscriber data it receives from SGSN 842 such as subscription or location information.

Serving Gateway (S-GW) 843 is an interface which provides connectivity between E-UTRAN 830 and Core Network 840. Functions of S-GW 843 include, but are not limited to, packet routing, packet forwarding, transport level packet processing, event reporting to Policy and Charging Rules Function (PCRF) 850, and mobility anchoring for inter-network mobility. PCRF 850 uses information gathered from S-GW 843, as well as other sources, to make applicable policy and charging decisions related to data flows, network resources and other network administration functions. Packet Data Network Gateway (PDN-GW) 845 may provide user-to-services connectivity functionality including, but not limited to, network-wide mobility anchoring, bearer session anchoring and control, and IP address allocation for PS domain connections.

Home Subscriber Server (HSS) 863 is a database for user information, and stores subscription data regarding Mobile Station 801 or User Equipment 802 for handling calls or data sessions. Networks may contain one HSS 863 or more if additional resources are required. Exemplary data stored by HSS 863 include, but is not limited to, user identification, numbering and addressing information, security information, or location information. HSS 863 may also provide call or session establishment procedures in both the PS and CS domains.

The VLR/MSC Server 860 provides user location functionality. When Mobile Station 801 enters a new network location, it begins a registration procedure. A MSC Server for that location transfers the location information to the VLR for the area. A VLR and MSC Server may be located in the same computing environment, as is shown by VLR/MSC Server 860, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 801 registration or procedures for handover of Mobile Station 801 to a different section of the Core Network 840. GMSC Server 861 may serve as a connection to alternate GMSC Servers for other mobile stations in larger networks.

Equipment Identity Register (EIR) 862 is a logical element which may store the International Mobile Equipment Identities (IMEI) for Mobile Station 801. In a typical embodiment, user equipment may be classified as either "white listed" or "black listed" depending on its status in the network. In one embodiment, if Mobile Station 801 is stolen and put to use by an unauthorized user, it may be registered as "black listed" in EIR 862, preventing its use on the network. Mobility Management Entity (MME) 864 is a control node which may track Mobile Station 801 or User Equipment 802 if the devices are idle. Additional functionality may include the ability of MME 864 to contact an idle Mobile Station 801 or User Equipment 802 if retransmission of a previous session is required.

While example embodiments of distributing connectivity and/or transmission time have been described in connection with various computing devices/processors, the underlying concepts can be applied to any computing device, processor, or system capable of distributing connectivity and/or transmission time as described herein. The methods and apparatuses for distributing connectivity and/or transmission time, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, not to be construed as a transitory signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for distributing connectivity and/or transmission time can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for determining if non-voice emergency services are available. When implemented on a general-purpose processor, the program code combines with the processor to provide a unique apparatus that operates to invoke the functionality of distributing connectivity and/or transmission time.

While distributing connectivity and/or transmission time has been described in connection with the various embodiments of the various figures, it is to be understood that other similar embodiments can be used or modifications and additions can be made to the described embodiments for distributing connectivity and/or transmission time. For example, one skilled in the art will recognize that distributing connectivity and/or transmission time as described in the present application may apply to any environment, whether wired or wireless, and may be applied to any number of devices connected via a communications network and interacting across the network. Therefore, distributing connectivity and/or transmission time should not be limited to any single embodiment, but rather should be construed in breadth and scope in accordance with the appended claims.

What is claimed:

1. A method comprising:
    receiving, by a machine-to-machine device, a short messaging service (SMS) message comprising an indication to initiate a connection;
    responsive to receiving the SMS message, determining a start time of a time interval within which to connect the machine-to-machine device and a network;
    randomly determining a value, R, between zero and one, inclusive;
    determining a product of R and a length of the time interval;
    determining a connection time by adding the product and the start time;
    establishing a connection between the machine-to-machine device and the network at the determined connection time;
    subsequent to establishing the connection at the determined connection time:
        parsing information to be transmitted between the machine-to-machine device and the network into plurality of portions;
        for each portion of the plurality of portions:
            randomly determining a respective value, R, between zero and one, inclusive;
            determining a respective product of a respective value of R and the length of the time interval; and
            determining a respective transmission time by adding the respective product and the start time; and
            transmitting, by the machine-to-machine device, each portion of the plurality of portions at the determined respective transmission time, wherein the start time is hashed and subsequently used for authentication of the transmitted each portion.

2. The method of claim 1, wherein the start time is received in an indication to initiate a connection between the communication device and the network.

3. The method of claim 1, wherein the start time is a time at which an indication to initiate a connection between the communication device and the network is received.

4. The method of claim 1, wherein a value of R is determined via at least one of a random number generator or a pseudorandom number generator.

5. The method of claim 4, wherein a seed of the at least one of the random number generator or the pseudorandom number generator comprises the start time.

6. The method of claim 4, wherein a seed of the at least one of the random number generator or the pseudorandom number generator comprises a serial number of the machine-to-machine device.

7. The method of claim 1, further comprising:
authenticating a transmission of information between the machine-to-machine device and the network during the established connection.

8. An apparatus comprising:
a processor; and memory coupled to the processor, the memory comprising executable instructions that when executed by the processor cause the processor to effectuate operations comprising:
receiving, by a machine-to-machine device, a short messaging service (SMS) message comprising an indication to initiate a connection;
responsive to receiving the SMS message, determining a start time of a time interval within which to connect the machine-to-machine device and a network;
randomly determining a value, R, between zero and one, inclusive;
determining a product of R and a length of the time interval;
determining a connection time by adding the product and the start time;
establishing a connection between the machine-to-machine device and the network at the determined connection time;
subsequent to establishing the connection at the determined connection time:
parsing information to be transmitted between the machine-to-machine device and the network into plurality of portions;
for each portion of the plurality of portions:
randomly determining a respective value, R, between zero and one, inclusive;
determining a respective product of a respective value of R and the length of the time interval; and
determining a respective transmission time by adding the respective product and the start time; and
transmitting, by the machine-to-machine device, each portion of the plurality of portions at the determined respective transmission time.

9. The apparatus of claim 8, wherein the start time is received in an indication to initiate a connection between the communication device and the network.

10. The apparatus of claim 8, wherein the start is a time at which an indication to initiate a connection between the communication device and the network is received.

11. The apparatus of claim 8, wherein a value of R is determined via at least one of a random number generator or a pseudorandom number generator.

12. The apparatus of claim 11, wherein a seed of the at least one of the random number generator or the pseudorandom number generator comprises the start time.

13. The apparatus of claim 11, wherein a seed of the at least one of the random number generator or the pseudorandom number generator comprises a serial number of the machine-to-machine device.

14. The apparatus of claim 8, the operations further comprising:
authenticating a transmission of information between the machine-to-machine device and the network during the established connection.

15. A computer-readable storage medium comprising executable instructions that when executed by a processor cause the processor to effectuate operation comprising:
receiving, by a machine-to-machine device, a short messaging service (SMS) message comprising an indication to initiate a connection;
responsive to receiving the SMS message, determining a start time of a time interval within which to connect the machine-to-machine device and a network;
randomly determining a value, R, between zero and one, inclusive;
determining a product of R and a length of the time interval;
determining a connection time by adding the product and the start time;
establishing a connection between the machine-to-machine device and the network at the determined connection time;
subsequent to establishing the connection at the determined connection time:
parsing information to be transmitted between the machine-to-machine device and the network into plurality of portions;
for each portion of the plurality of portions:
randomly determining a respective value, R, between zero and one, inclusive;
determining a respective product of a respective value of R and the length of the time interval; and
determining a respective transmission time by adding the respective product and the start time; and
transmitting, by the machine-to-machine device, each portion of the plurality of portions at the determined respective transmission time.

16. The computer-readable storage medium of claim 15, wherein the start time is received in an indication to initiate a connection between the communication device and the network.

17. The computer-readable storage medium of claim 15, wherein the start time is a time at which an indication to initiate a connection between the communication device and the network is received.

18. The computer-readable storage medium of claim 15, wherein a value of R is determined via at least one of a random number generator or a pseudorandom number generator.

19. The computer-readable storage medium of claim 18, wherein a seed of the at least one of the random number generator or the pseudorandom number generator comprises the start time.

20. The computer-readable storage medium of claim 18, wherein a seed of the at least one of the random number generator or the pseudorandom number generator comprises a serial number of the machine-to-machine device.

* * * * *